US012608164B2

(12) United States Patent
Bhattacharjee et al.

(10) Patent No.: US 12,608,164 B2
(45) Date of Patent: *Apr. 21, 2026

(54) INCREASING PROVISIONED STORAGE CAPACITY BY MEANS OF GROWING UNDERLYING DISKS WITHIN A STORAGE APPLIANCE

(71) Applicant: NetApp, Inc., San Jose, CA (US)

(72) Inventors: Mrinal K. Bhattacharjee, Bangalore (IN); Jagadish Vasudeva, Bangalore (IN); Sateesh Kumar Pola, Bangalore (IN)

(73) Assignee: NetApp, Inc., San Jose, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/921,549

(22) Filed: Oct. 21, 2024

(65) Prior Publication Data

US 2025/0044992 A1 Feb. 6, 2025

Related U.S. Application Data

(63) Continuation of application No. 17/468,892, filed on Sep. 8, 2021, now Pat. No. 12,124,742.

(30) Foreign Application Priority Data

Jul. 23, 2021 (IN) .............................. 202141033213

(51) Int. Cl.
*G06F 3/00* (2006.01)
*G06F 3/06* (2006.01)
(52) U.S. Cl.
CPC .......... *G06F 3/0665* (2013.01); *G06F 3/0604* (2013.01); *G06F 3/0631* (2013.01); *G06F 3/067* (2013.01); *G06F 3/0689* (2013.01)

(58) Field of Classification Search
CPC .... G06F 3/0665; G06F 3/0604; G06F 3/0631; G06F 3/067; G06F 3/0689
See application file for complete search history.

(56) References Cited

U.S. PATENT DOCUMENTS

2010/0333116 A1* 12/2010 Prahlad ................. G06F 3/0605
713/153
2015/0331635 A1 11/2015 Ben-Shaul et al.
(Continued)

OTHER PUBLICATIONS

Edwards J.K., et al., "FlexVol: Flexible, Efficient File Volume Virtualization in WAFL," Retrieved from the internet: URL: https://www.usenix.org/legacy/event/usenix08/tech/full_papers/edwards/edwards_html/netapp2008-flexvols.html, 2008, 23 pages.
(Continued)

*Primary Examiner* — Craig S Goldschmidt
(74) *Attorney, Agent, or Firm* — Jaffery Watson Hamilton & DeSanctis LLP

(57) ABSTRACT

Systems and methods for supporting dynamic disk growth within a storage appliance are provided. According to one embodiment, a portion of a logical size of each of multiple disks (e.g., hyperscale disks or Logical Unit Numbers (LUNs)) are provisioned for use by a storage system as backing for respective file system disks. To accommodate growth, block numbers for the file system disks are pre-allocated within a sparse space of a contiguous sequence of block numbers corresponding to a number of blocks represented by the logical size. Metadata is maintained for the file system disks regarding a range of the pre-allocated block numbers that are available for use. Responsive to a triggering condition, the provisioned portion of a disk is increased and subsequently, responsive to detecting a change in a size of the disk by the storage system, a size of the corresponding file system disk is updated within the metadata.

20 Claims, 8 Drawing Sheets

(56)  References Cited

U.S. PATENT DOCUMENTS

2018/0349063 A1 *  12/2018  Matsushita ........... G06F 3/0607
2023/0024060 A1      1/2023  Bhattacharjee et al.

OTHER PUBLICATIONS

Non-Final Office Action mailed on Aug. 9, 2023 for U.S. Appl. No. 17/468,892, filed Sep. 8, 2021, 10 pages.
Notice of Allowance mailed on Jul. 8, 2024 for U.S. Appl. No. 17/468,892, filed Sep. 8, 2021, 02 pages.
Notice of Allowance mailed on Jun. 24, 2024 for U.S. Appl. No. 17/468,892, filed Sep. 8, 2021, 12 pages.

* cited by examiner

INCREASING PROVISIONED STORAGE CAPACITY BY MEANS OF GROWING UNDERLYING DISKS WITHIN A STORAGE APPLIANCE

CROSS-REFERENCE TO RELATED APPLICATIONS

This application is a continuation of U.S. patent application Ser. No. 17/468,892, filed on Sep. 8, 2021, which claims the benefit of Indian Provisional Application No. 202141033213, filed on Jul. 23, 2021, both of which are hereby incorporated by reference in their entirety for all purposes.

BACKGROUND

Field

Various embodiments of the present disclosure generally relate to data storage systems. In particular, some embodiments relate to an approach for growing provisioned storage capacity in storage systems by means of growing underlying disks.

Description of the Related Art

Data management software (e.g., ONTAP software from NetApp, Inc. of San Jose, CA) includes a number of features specifically designed to facilitate creation and management of efficient, secure, and continuous operations of storage infrastructure. For example, the proprietary Write Anywhere File Layout (WAFL) Copy-on-Write file system (which represents a component or layer of the ONTAP software) includes algorithms and data structures to efficiently implement snapshots, which are read-only clones of the active file system.

Making available the numerous features of data management software and their various components (e.g., the file system layer, the redundant array of independent disks (RAID) layer, and the storage layer), which in many cases were originally designed for use with physical storage appliances and systems, to virtual storage appliances and systems is more complex than simply containerizing the data management software or running it on a virtual machine (VM).

Meanwhile, the usage models and customer incentives differ for physical and virtual storage appliances. In the context of physical storage systems, customers typically overprovision the storage system by purchasing physical devices, having an aggregate storage capacity in excess of what they believe they might need over the course of the expected life of the storage system, which may then be mounted in racks within a data center. In contrast, virtual storage capacity is charged to customers in accordance with a Pay-As-You-Go model, as such in order to be cost efficient customers typically start small and grow the storage capacity over time. The storage capacity of a physical storage system is typically increased by adding disks, but the disk capacity itself is not dynamically resized as is the case with storage volumes in the cloud (e.g., Amazon Web Services (AWS) Elastic Block Store (EBS), Google Cloud Platform (GCP) persistent disks (PDs), and Microsoft Azure managed disks (MDs), which may be referred to herein as "cloud disks" or "hyperscale disks."

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
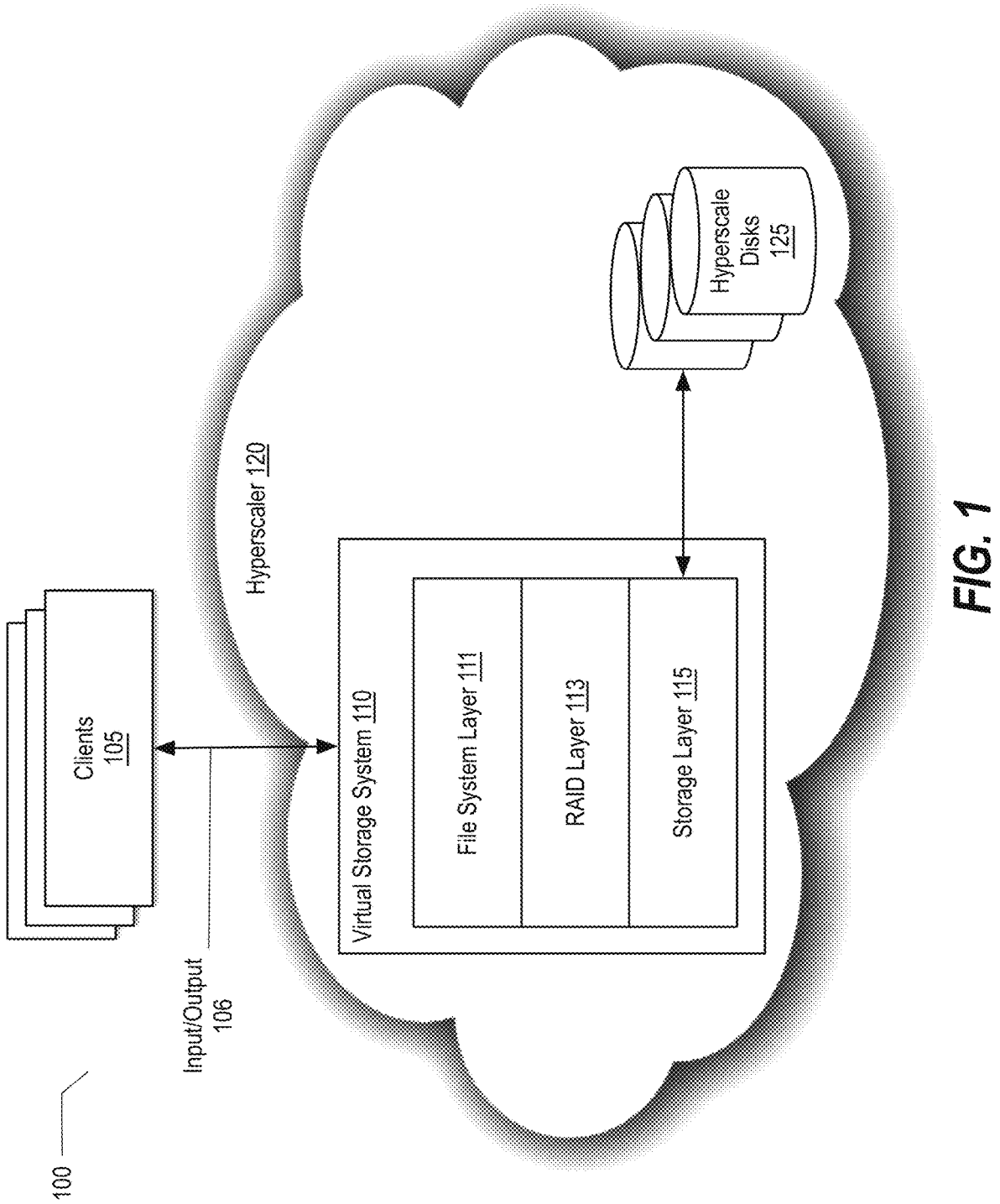
FIG. 1 is a high-level block diagram conceptually illustrating a virtual storage system with hyperscale disks in accordance with an embodiment of the present disclosure.

Systems and methods are described for supporting dynamic disk growth within a storage appliance. As noted above, making available the numerous features of data management software and their various components to virtual storage appliances and systems, which make use of cloud disks is more complex than simply containerizing the data management software or running it on a VM. One potential approach for accommodating the growth of underlying hyperscale disks of a virtual storage system would be add a new range of block numbers to corresponding file system disks as new portions of the underlying hyperscale disks are provisioned, but this complicates the mapping of a given volume block number (VBN) to a particular disk and disk block number. Another option would be to simply treat each newly provisioned portion of a hyperscale disk as a new disk; however, limitations of container orchestration engines (e.g., Kubernetes) and VMs preclude the addition of a disk to a running Pod. As such, the Pod running the data management software instance would need to be stopped to allow the disk to be attached and then restarted. Such a disruptive operation is not acceptable for numerous business use cases. While disruptions can be reduced by enforcing a minimum initial storage size (e.g., in the terabyte (TB) range) and a minimum incremental growth size (e.g., also in TBs), customers may not wish to provision TBs at a time while making use of a Pay-As-You-Go model due to the cost inefficiency.

As described further below, embodiments described herein seek to address various of the foregoing issues by pre-allocating VBNs for an "aggregate" (a volume comprised of a collection of disks) within a contiguous sequence of volume block numbers while leaving room for growth to the maximum size (or "logical size") of the underlying hyperscale disks. The approach described herein involving pre-allocating a contiguous range of VBNs within the file system for each hyperscale disk employed by a virtual storage system simplifies the task of both VBN mapping and accommodating subsequent growth of file system disks responsive to growth of corresponding hyperscale disks. For example, the number of VBN ranges to be managed is limited and the mapping of a given VBN to a corresponding disk number and disk block number is more straightforward.

As explained further below, depending on the particular implementation, a basic disk grow feature may be implemented with or without one or more enhanced features (e.g., storage thin provisioning). According to one embodiment, the basic disk grow feature, may trigger the growth of one of more hyperscale disks of a virtual storage system responsive to a request from an end user. Additionally or alternatively, the virtual storage system may attempt to provision less storage than requested by an end user and when the utilization of the provisioned storage capacity reaches a threshold, additional storage capacity may be provisioned by the virtual storage system.

While some embodiments of the present disclosure are described herein with reference to particular usage scenarios in the context of a virtual storage system with hyperscale disks, it is to be understood that the methodologies and algorithms are equally applicable to any storage system (virtual or physical) with any type of disks (e.g., Logical Unit Numbers (LUNs)) that can grow.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, a virtual storage system 110 may be run (e.g., on a VM or as a containerized instance, as the case may be) within a public cloud provider (e.g., hyperscaler 120). In the context of the present example, the virtual storage system 110 makes use of cloud disks (e.g., hyperscale disks 125) provided by the hyperscaler.

The virtual storage system 110 may present storage over a network to clients 105 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 105 may request services of the virtual storage system 110 by issuing Input/Output requests 106 (e.g., file system protocol messages (in the form of packets) over the network). A representative client of clients 105 may comprise an application, such as a database application, executing on a computer that "connects" to the virtual storage system 110 over a computer network, such as a point-to-point link, a shared local area network (LAN), a wide area network (WAN), or a virtual private network (VPN) implemented over a public network, such as the Internet.

In the context of the present example, the virtual storage system 110 is shown including a number of layers, including a file system layer 111, a RAID layer 113, and a storage layer 115. These layers may represent components of data management software (not shown) of the virtual storage system 110. The file system layer 111 generally defines the basic interfaces and data structures in support of file system operations (e.g., initialization, mounting, unmounting, creating files, creating directories, opening files, writing to files, and reading from files). The RAID layer 113 encapsulates data storage virtualization technology for combining multiple disks into RAID groups, for example, for purposes of data redundancy, performance improvement, or both. The storage layer 115 may include storage drivers for interacting with the various types of hyperscale disks supported by the hyperscaler 120.

Example Sparse Space

Figure 2:
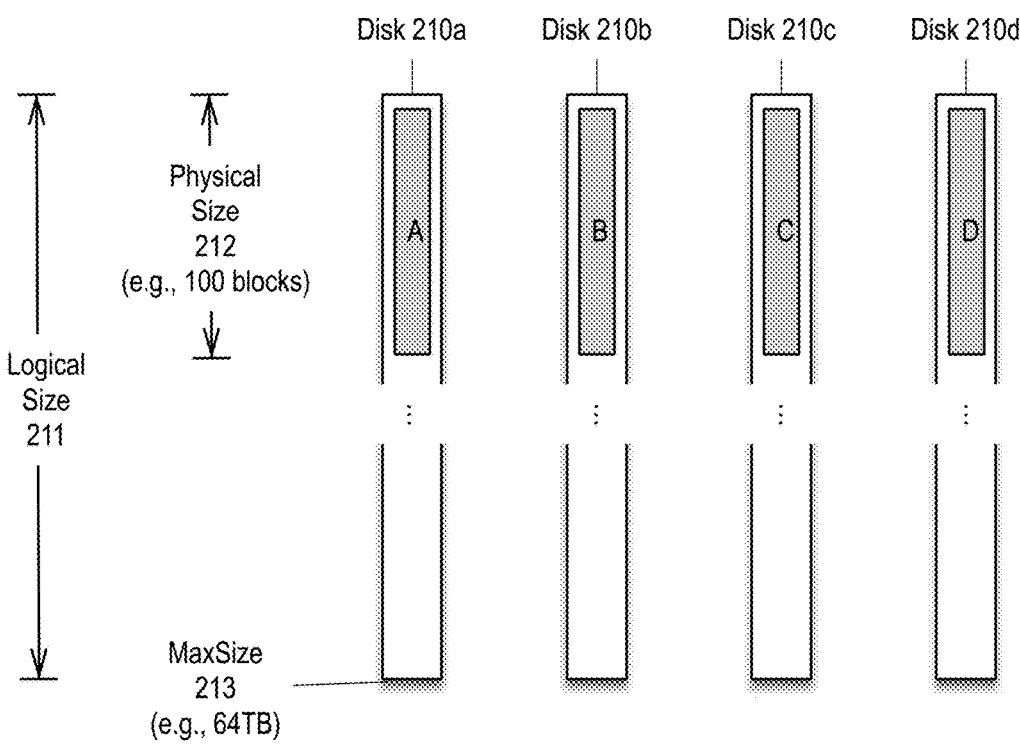
FIG. 2 is a block diagram conceptually illustrating the relationship between the physical and logical sizes of hyperscale disks and corresponding volume block numbers (VBNs) within a sparse block number space of a WAFL aggregate in accordance with an embodiment of the present disclosure.
Figure 2:
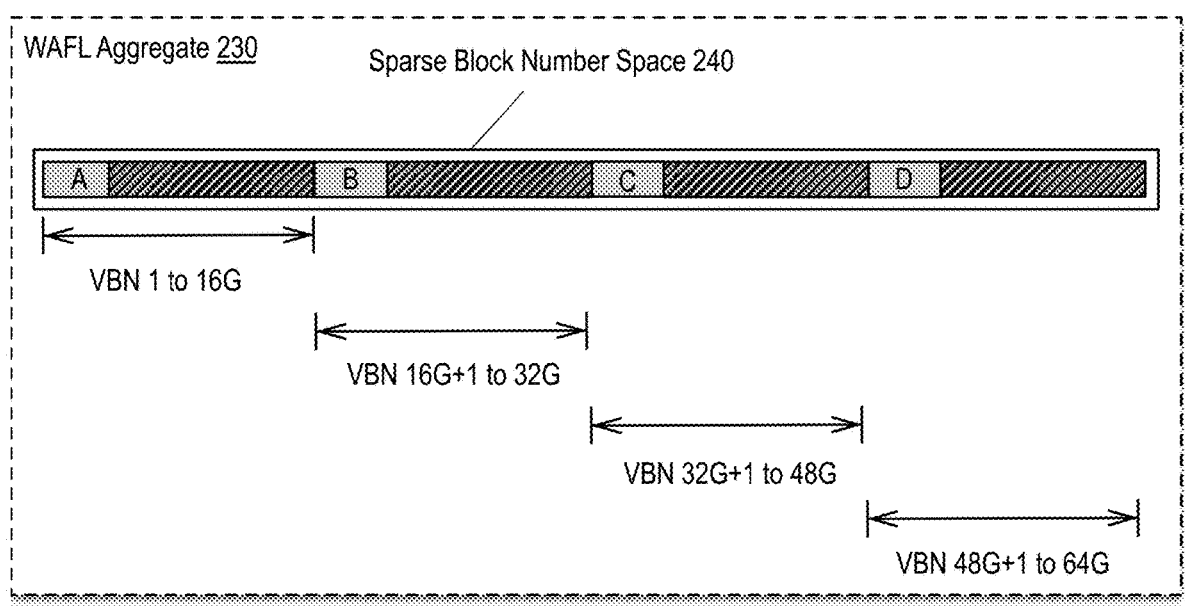

FIG. 2 is a block diagram conceptually illustrating the relationship between the physical and logical sizes of hyperscale disks (e.g., disks 210a-d) and corresponding volume block numbers (VBNs) within a sparse block number space 240 of a WAFL aggregate 230 in accordance with an embodiment of the present disclosure. Hyperscalers provide various types of volumes (which may be referred to as hyperscale disks) having different performance characteristics, sizes, and pricing.

As used herein, the "logical size" (e.g., logical size 211) of a hyperscale disk refers to a maximum storage capacity (e.g., MaxSize 213) supported by the particular type of the hyperscale disk, whereas the "physical size" (e.g., physical size 212) of a hyperscale disk refers to the storage capacity of the hyperscale disk that is currently provisioned for use by a file system (e.g., WAFL) of a virtual storage system (e.g., virtual storage system 110) and the configured size of the corresponding representation or abstraction of the hyperscale disk (which may be referred to herein as a file system disk) within the file system.

As input/output operations per second (IOPS) improvements resulting from increasing the provisioned storage capacity of some hyperscale disks may be capped, in some embodiments, the logical size of a hyperscale disk may refer to the provisioned storage capacity of the particular hyperscale disk beyond which no further improvements are realized for the particular hyperscale disk.

In order to accommodate the Pay-As-You-Go model, in various examples described herein, a relatively small amount of storage capacity (e.g., on the order of tens or hundreds of gigabytes (GBs)) may be provisioned at a time for use by the virtual storage system.

For purposes of providing a concrete example of how VBNs may be pre-allocated within a contiguous sequence of block numbers (e.g., the sparse space 240) maintained by the file system to track file system disks corresponding to the hyperscale disks, certain non-limiting assumptions are made in connection with the discussion of FIG. 2, including an initial aggregate (e.g., a collection of disks, such as a RAID group) includes four disks (numbered 0 to 3, respectively), the logical size 211 of each hyperscale disk is 64 terabytes (TB), an initial physical size provisioned from each hyperscaler disk is 100 blocks, and the block size is 4 kilobytes (KB). The optimal number and type of hyperscale disks to be used for any particular virtual storage system may depend upon a number of factors, including the workloads to be supported, failover time requirements, IOPS needs, etc.

In general and without taking into consideration space that may be used for file system metadata that may be stored at the beginning of the first file system disk, the start VBN for each file system disk of a volume (e.g., WAFL aggregate 230) of a virtual storage system may be pre-allocated within the sparse block number space 240 based on the following:

$$Start\ VBN = N * MaxSize/BlockSize + 1 \qquad \text{EQ \#1}$$

where,

N is the file system disk number;

MaxSize is the maximum storage capacity (logical size) of the underlying hyperscale disk; and BlockSize is the size of a block of storage.

In embodiments in which file system metadata is stored at the beginning of the first hyperscale disk, the start VBN for the first system disk may be treated as a special case as it may have fewer usable VBNs than other file system disks. For example, the number of VBNs used by the file system metadata may be added to the VBN returned by EQ #1 to arrive at the start VBN for the first file system disk.

In the context of the present example, VBNs 1 to 16 billion (G) are pre-allocated for a first file system disk to accommodate the logical size of disk 210*a*, including the currently provisioned portion (A) of disk 210*a*; VBNs 16G+1 to 32G are pre-allocated for a second file system disk to accommodate the logical size of disk 210*b*, including the currently provisioned portion (B) of disk 210*b*; VBNs 32G+1 to 48G are pre-allocated for a third file system disk to accommodate the logical size of disk 210*c*, including the currently provisioned portion (C) of disk 210*c*; and VBNs 48G+1 to 64G are pre-allocated for a fourth file system disk to accommodate the logical size of disk 210*d*, including the currently provisioned portion (D) of disk 210*d*. An example of a sparse space initialization process is described further below with reference to FIG. 4.

In this manner, each file system disk has room to grow within the contiguous sequence of block numbers maintained by the WAFL aggregate 230 as additional storage capacity of the corresponding underlying hyperscale disk is provisioned for use.

Figures 3A, 3B, 3C:
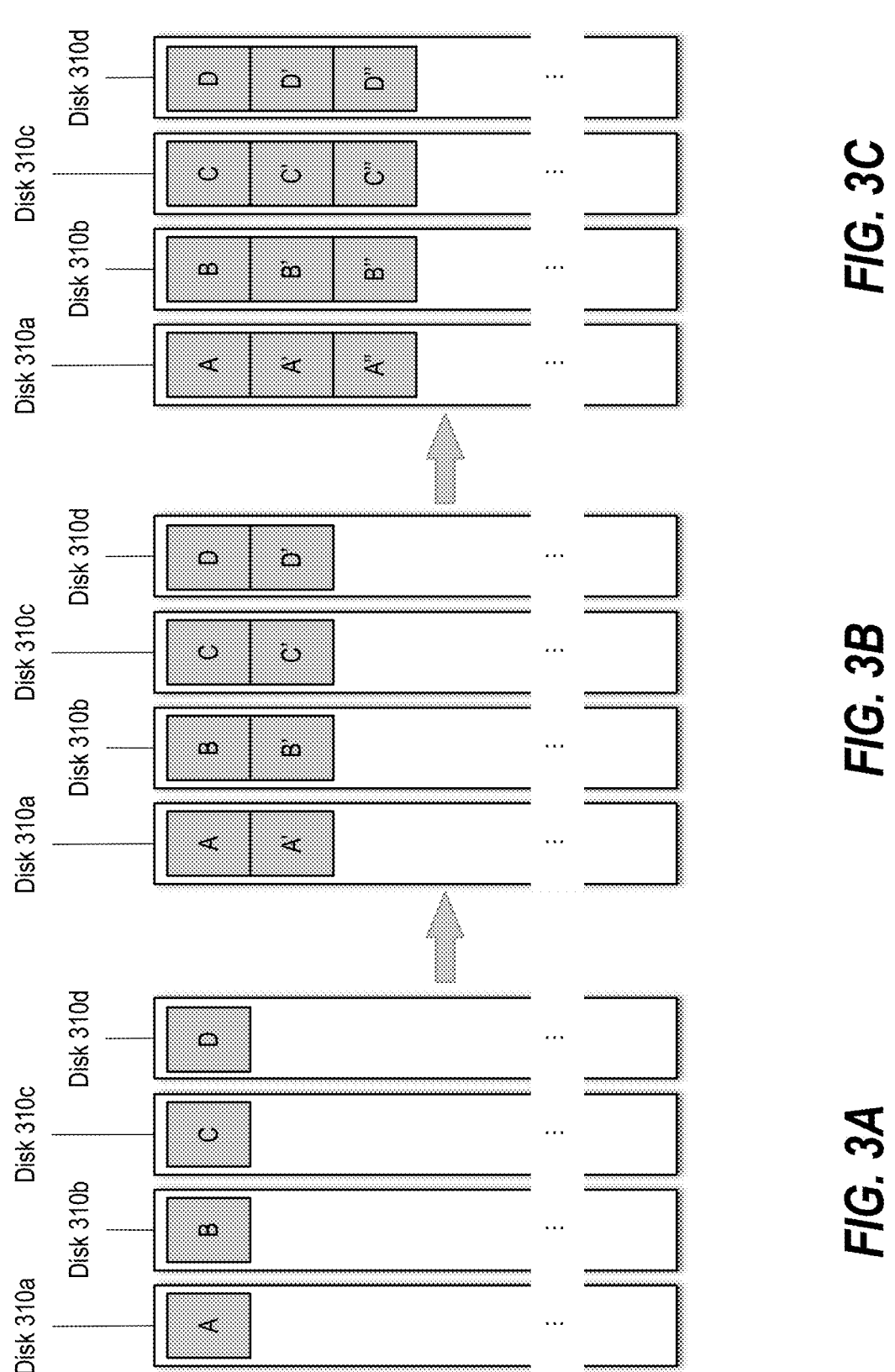
FIGS. 3A-C are block diagrams conceptually illustrating the growth of a set of hyperscale disks in accordance with an embodiment of the present disclosure.

FIGS. 3A-C are block diagrams conceptually illustrating the growth of a set of hyperscale disks (e.g., disks 310*a-d*) in accordance with an embodiment of the present disclosure. In FIG. 3A, predetermined amount of storage capacity (e.g., a predetermined number of blocks represented by A, B, C, and D) may be provisioned from each hyperscale disk for use by a virtual storage system (e.g., virtual storage system 110). Assuming the initial provisioned storage capacity for each hyperscale disk is X and the maximum supported storage capacity of each of the hyperscale disks is N, at this point, the physical size of an aggregate including disks 310*a-d* is 4X and the logical size is 4N.

As described further below and as shown in FIG. 3B, responsive to a predetermined threshold of the provisioned portion of the storage being used, an additional predetermined amount of storage capacity (e.g., represented by A', B', C', and D') may be provisioned from each disk 310*a-d* and made available for use by the virtual storage system. At this point, the physical size of the aggregate is now 8X and the logical size remains 4N.

As shown in FIG. 3C, this process of increasing the provisioned portions of disks 310*a-d* by an additional predetermined amount of storage capacity (e.g., represented by A", B", C", and D") may be repeated until the maximum size of the hyperscale disks are reached. At the point in time represented by FIG. 3C, the physical size of the aggregate is 12X and the logical size remains 4N. When the maximum size of each of the hyperscale disks has been provisioned, both the physical size of the aggregate and the logical size will be 4N. At that point, should additional storage capacity be required, one or more additional hyperscale disks may be added.

The various layers described herein, and the processing described below with reference to the flow diagrams of FIGS. 4-7 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 8 below.

Sparse Space Initialization

Figure 4:
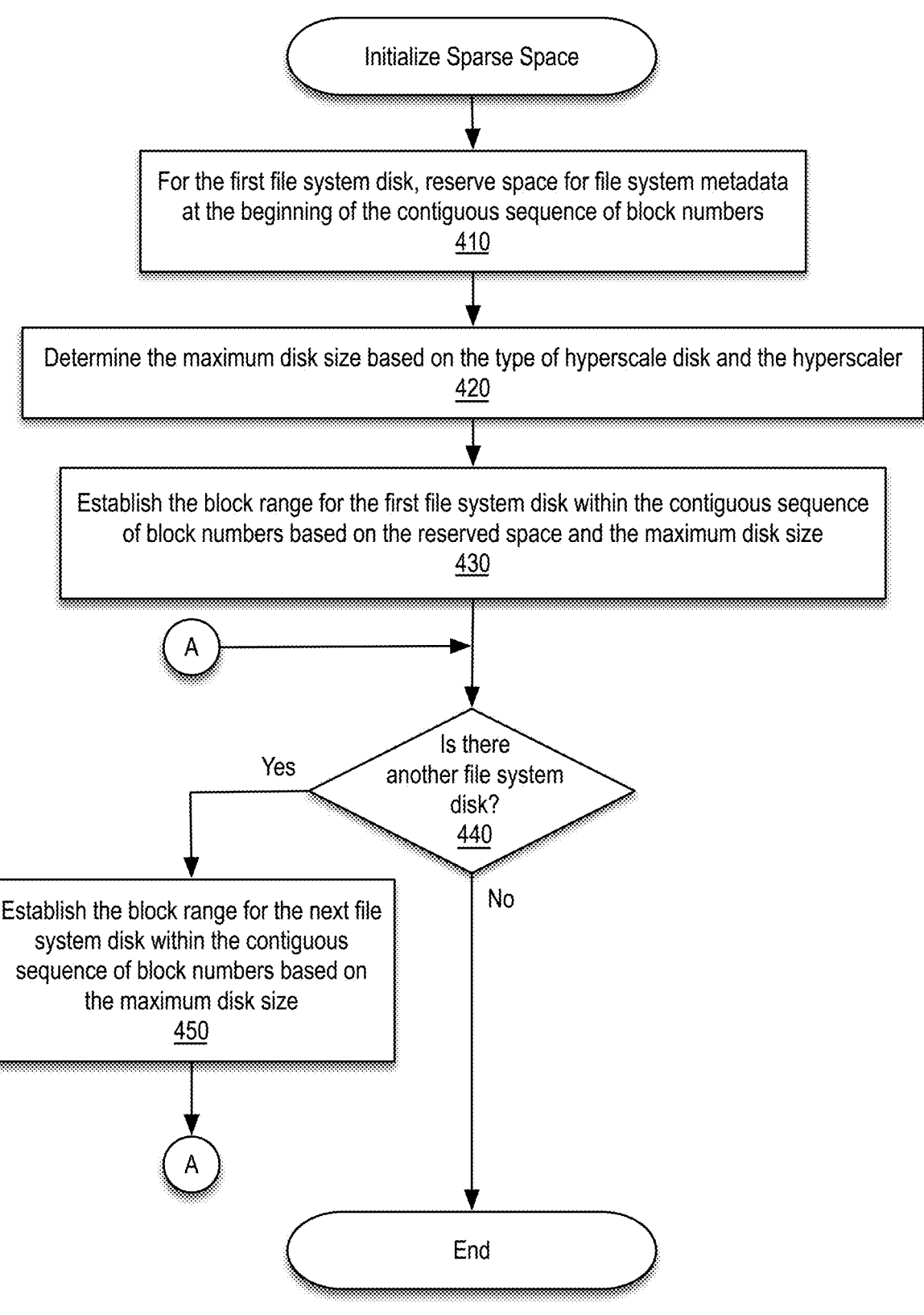
FIG. 4 is a flow diagram illustrating initialization of the sparse space of a WAFL aggregate in accordance with an embodiment of the present disclosure.

FIG. 4 is a flow diagram illustrating initialization of the sparse space of a WAFL aggregate in accordance with an embodiment of the present disclosure. In the context of the present example, it is assumed a virtual storage system (e.g., virtual storage system 110) has been initialized with a set of file system disks, for example, representing a WAFL aggregate (e.g., WAFL aggregate 230) in which each file system disk represented within a file system layer (e.g., file system layer 111) is backed by a corresponding hyperscale disk (e.g., disks 210a-d) and a contiguous sequence of VBNs (e.g., sparse block number space 240) for the underlying hyperscale disks has yet to be established within the file system layer (e.g., WAFL).

At block 410, for the first file system disk, space may be reserved at the beginning of the contiguous sequence of block numbers for storage of file system metadata (e.g., a magic number indicating it is a disk in use in a WAFL aggregate, the physical size of the disk, the start VBN, and the type of RAID being used) relating to the WAFL aggregate.

At block 420, the maximum disk size (e.g., MaxSize 213) is determined for the hyperscale disk corresponding to the first file system disk based on the type of hyperscaler disk and the hyperscaler. Depending upon the particular implementation, this information may be fetched directly or indirectly from the hyperscaler, for example, via an application programming interface (API) call. As noted above, hyperscalers provide various types of hyperscale disks, which may have different performance characteristics, logical sizes (total available capacity), and pricing. For example, AWS EBS provides six volume types (i.e., provisioned Input/Output Operations Per Second (IOPS) Solid-State Drive (SSD) (io2 and io1), general purpose SSD (gp3 and gp2), throughput optimized Hard Disk Drive (HDD) (st1) and cold HDD (sc1)); Azure provides ultra disks, premium SSDs, standard SSDs, and standard HDD; and GCP provides standard provisioned space, SSD provisioned space, balanced provisioned space, extreme provisioned space, extreme provisioned IOPS, regional standard provisioned space, regional SSD provisioned space, regional balanced provisioned space, snapshot storage, and multi-regional snapshot storage.

At block 430, based on the reserved space for file system metadata and the maximum disk size, the block range for the first file system disk may be established within the contiguous sequence of block numbers maintained by the file system. According to one embodiment, a data structure may be maintained by the file system (e.g., within file system layer 111) for each file system disk, including information defining a VBN range for the file system disk. For example, a file system disk data structure my include a start VBN and a size (e.g., in blocks) of the currently useable portion (the logical size) of the underlying hyperscale disk. The start VBN may be set based on the maximum disk size and the block size based on EQ #1 and the size of the currently useable portion of the file system disk may be set to a predetermined size, representing the size in blocks of the initial provisioned storage capacity from the underlying hyperscale disk. During this sparse space initialization process or separately, a size of a representation or abstraction of the hyperscale disk may also be initialized within a disk data structure within a storage layer (e.g., storage layer 115). While for simplicity in the context of various examples described herein, the predetermined size may be assumed to be the same for the initial provisioning of storage capacity and subsequent provisioning of storage capacity for all hyperscale disks, it is to be appreciated different predetermined sizes may be used.

At decision block 440, it is determined whether initialization is to be performed for another file system disk. If so, then processing continues with block 450; otherwise, sparse space initialization processing is complete.

At block 450, the block range for the next file system disk is established within the contiguous sequence of block numbers. For example, as above, the start VBN and size of the next file system disk may be set within the file system disk data structure based on the maximum size of the corresponding hyperscale disk and the disk number using EQ #1. This sparse space initialization process may continue until VBN ranges have been pre-allocated for all file system disks of the aggregate.

In some embodiments, information regarding the total number of blocks (the total usable space) associated with the aggregate may also be initialized based on the number of blocks initially provisioned for each file system disk. This total number of blocks may be used for space reporting.

In embodiments, file system scanners (e.g., WAFL scanners) and other block scanners that may periodically walk through the VBN space may be limited to the currently provisioned physical region (e.g., skipping the holey region) with reference to the VBN ranges maintained within the file system layer.

Volume Block Number (VBN) Mapping

As noted above, the approach described herein involving pre-allocating a contiguous range of VBNs within the file system for each hyperscale disk employed by a virtual storage system (e.g., virtual storage system 110) simplifies the task of VBN mapping a non-limiting example of which is described with reference to FIG. 5.

Figure 5:
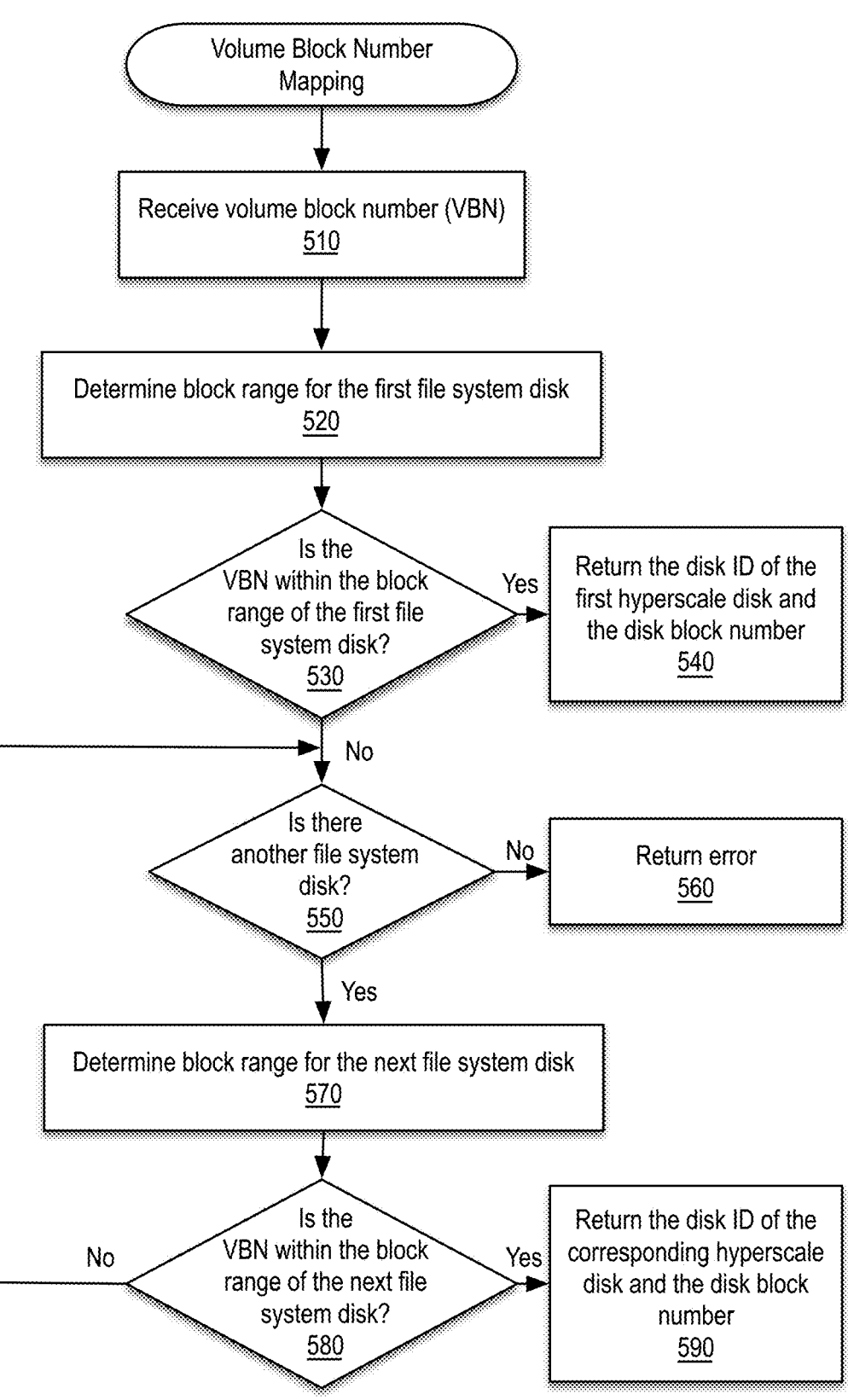
FIG. 5 is a flow diagram illustrating mapping of a volume block number (VBN) to a corresponding disk identifier (ID) and disk block number in accordance with an embodiment of the present disclosure.

FIG. 5 is a flow diagram illustrating mapping of a volume block number (VBN) to a corresponding disk identifier (ID) and disk block number in accordance with an embodiment of the present disclosure. The efficiency of performing VBN mapping has performance implications as it is a common task performed in support of read and write operations. By pre-allocating a contiguous range of VBNs within the file system for each hyperscale disk as described with reference to FIG. 3, there are fewer VBN ranges to be managed than an approach in which new ranges of VBNs are allocated each time the amount of provisioned storage capacity of the underlying hyperscale disks is increased.

At block 510, a VBN is received. The VBN may be received, for example, prior to the performance of a write or a read operation to or from the VBN.

At block 520, the VBN range for the first file system disk is determined. For example, the start VBN and the size of the first file system disk may be retrieved from a file system disk data structure.

At decision block 530, a determination is made regarding whether the VBN is within the VBN range (e.g., whether start VBN≥VBN≥start VBN+MaxSize). If so, then processing continues with block 540; otherwise, processing branches to decision block 550.

At block 540, the disk ID of the first hyperscaler disk and the disk block number are returned. According to one embodiment, information regarding the disk ID may be included with the file system disk data structure. In general and without taking into consideration space that may be used for file system metadata that may be stored at the beginning of the first file system disk, the disk block number may be calculated based on the following:

$$Disk\ Block\ Number = VBN - (N * MaxSize/BlockSize) \qquad EQ\ \#2$$

where,

N is the file system disk number;

MaxSize is the maximum storage capacity (logical size) of the underlying hyperscale disk; and BlockSize is the size of a block of storage.

In embodiments in which file system metadata is stored at the beginning of the first hyperscale disk, the disk block number for the first system disk may be treated as a special case as it may have fewer usable VBNs than other file system disks. For example, the number of VBNs used by the file system metadata may be added to the disk block number returned by EQ #2 to arrive at the disk block number for the first file system disk.

At decision block 550, it is determined whether there is another file system disk. That is, whether there is another VBN range to be considered. If so, then processing continues with block 570; otherwise, processing branches to block 560 where an error may be returned as the VBN does not fall within an existing VBN range.

At block 570, the VBN range for the next file system disk is determined. For example, the start VBN and the size of the next file system disk may be retrieved from the file system disk data structure.

At decision block 580, a determination is made regarding whether the VBN is within the VBN range (e.g., whether start VBN≥VBN≥start VBN+MaxSize) of the next file system disk. If so, then processing continues with block 590; otherwise, processing loops back to decision block 550.

At block 590, the disk ID of the corresponding hyperscaler disk and the disk block number are returned. According to one embodiment, the disk block number may be calculated based on the VBN, the file system disk number, the maximum physical size of the corresponding hyperscale disk, and the size of a block of storage in accordance with EQ #2.

Triggering of Hyperscale Disk Growth

As noted above, in one embodiment, storage thin provisioning may be performed in addition to or separate and apart from a basic workflow in which one or more hyperscale disks are grown responsive to a request from an end user. For purposes of illustration, consider an example of a virtual storage system (e.g., virtual storage system 110) with four disks and assume the end-user provisions 400 blocks of storage. In one embodiment, in which storage thin provisioning is enabled, the virtual storage system may start with 4 disks that having a physical size of less than 100 blocks each. Assume, for example, the virtual storage system starts with disks having a physical size of 25 blocks each. That is, the virtual storage system provisions 100 blocks (in this non-limiting example) instead of the full requested 400 blocks. If the end-user writes fewer than 100 blocks, or if a compression-deduplication feature implemented by the virtual storage system manages to keep the actual block utilization to less than 100 blocks, then the storage service provider (e.g., the provider of the virtual storage system) saves on the cost of the 300 blocks that were requested but not actually utilized. However, if the actual utilization approaches 100 blocks, the virtual storage system may trigger a hyperscale disk grow followed by a provisioned capacity grow as described below with reference to FIGS. 6 and 7. For instance, in the context of the present example, if utilization reaches 80 blocks, the virtual storage system may grow each disk by an additional 10 blocks, so the physical size of each disk would now be 35 blocks, and actual provisioned capacity is grown to 140 blocks. This storage thin provisioning disk growth cycle may be repeated.

Figure 6:
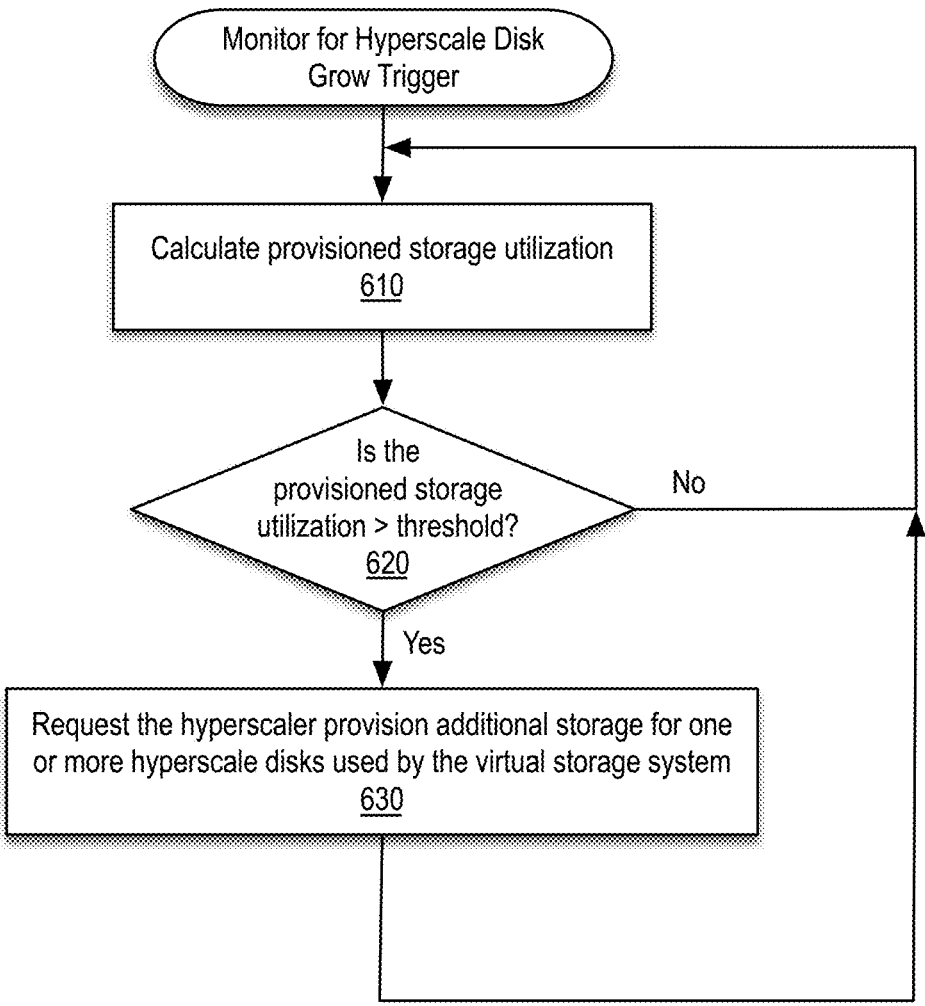
FIG. 6 is a flow diagram illustrating a periodic monitoring process to identify a triggering condition for growing a hyperscale disk in accordance with an embodiment of the present disclosure.

FIG. 6 is a flow diagram illustrating a periodic monitoring process to identify a triggering condition for growing a hyperscale disk in accordance with an embodiment of the present disclosure. Depending upon the particular implementation, the periodic monitoring process may be performed by a process associated with the file system or by an external process. This check could be done as part of every file system operation that uses new blocks, or this could be done at a fixed time interval (e.g., every N seconds), or this could be done during certain file-system events (e.g., during a consistency-point (CP) in the WAFL file-system). In the context of the present example, it is assumed the underlying hyperscale disks have not reached their maximum sizes. As noted above, if this is not the case, then one or more additional hyperscale disks may be added to the aggregate (e.g., WAFL aggregate 230).

At block 610, the monitoring process calculates a measure of provisioned storage utilization. In one embodiment, the file system layer (e.g., file system layer 111) is aware of the size of the disks provisioned as well as the current amount of the storage capacity consumed. The monitoring process may invoke one or more methods of an API exposed by the WAFL file system to obtain the physical size of the provisioned disk as well as the current amount of storage capacity consumed and may calculate the provisioned storage utilization based thereon.

At decision block 620, the monitoring process determines whether the provisioned storage utilization is greater than a threshold. If so, then processing continues with block 630; otherwise, the processing loops back to block 610 after delaying for an amount of time representing the monitoring interval.

At block 630, the hyperscaler is requested to provision additional storage for one or more hyperscale disks. For example, an API method of the hyperscaler may be called to increase the provisioned storage capacity (physical size) of the one or more hyperscale disks.

For completeness, the above example illustrates a more advanced workflow in which storage thin provisioning may be performed. As noted above, however, depending on the particular implementation, a basic disk grow feature may be implemented with or without one or more enhanced features (e.g., storage thin provisioning). According to one embodiment, the basic disk grow feature, may trigger the growth of one of more hyperscale disks of a virtual storage system responsive to a request from an end user. That is, the hyperscaler may be requested to provision additional storage without performing the provisioned storage utilization threshold check described with reference to decision block 620. For example, in the four disk examples described herein, assume a user provisions 400 blocks of storage. Then, the virtual storage system 100 may be initially provisioned with 4 disks of size 100 blocks each. At a later time, assume the user requests to grow his/her provisioned capacity to 500 blocks from 400 blocks. Then, the virtual storage system 100 may grow each disk to 125 blocks responsive to the user request. In this basic disk grow example, the trigger to grow hyperscale disks is derived solely from the end-user's request to grow his/her provisioned capacity and without reference to the current provisioned storage utilization. Alternatively, or additionally, storage thin provisioning may be performed on top of this base functionality in which the virtual storage system attempts to provision less storage than what the end-users ask for as described above so as to attempt to achieve costs savings on behalf of the storage service provider.

Triggering of File System Disk Growth

Growth of an underlying hyperscale disk may be performed responsive to monitoring the storage utilization as discussed above with reference to FIG. 6 (storage thin provisioning) or responsive to receipt of a request by an end user. Regardless of the cause of the growth of the underlying hyperscale disk, after the physical size of a given hyperscale disk has been increased, the virtual storage system should be informed of the change. For example, the change in provisioned storage capacity should be propagated throughout the file system layer 111, the RAID layer 113, and the storage layer 115. A non-limiting example, of triggering the growth of a given file system disk responsive to the growth of the physical size of a corresponding hyperscale disk is described with reference to FIG. 7.

Figure 7:
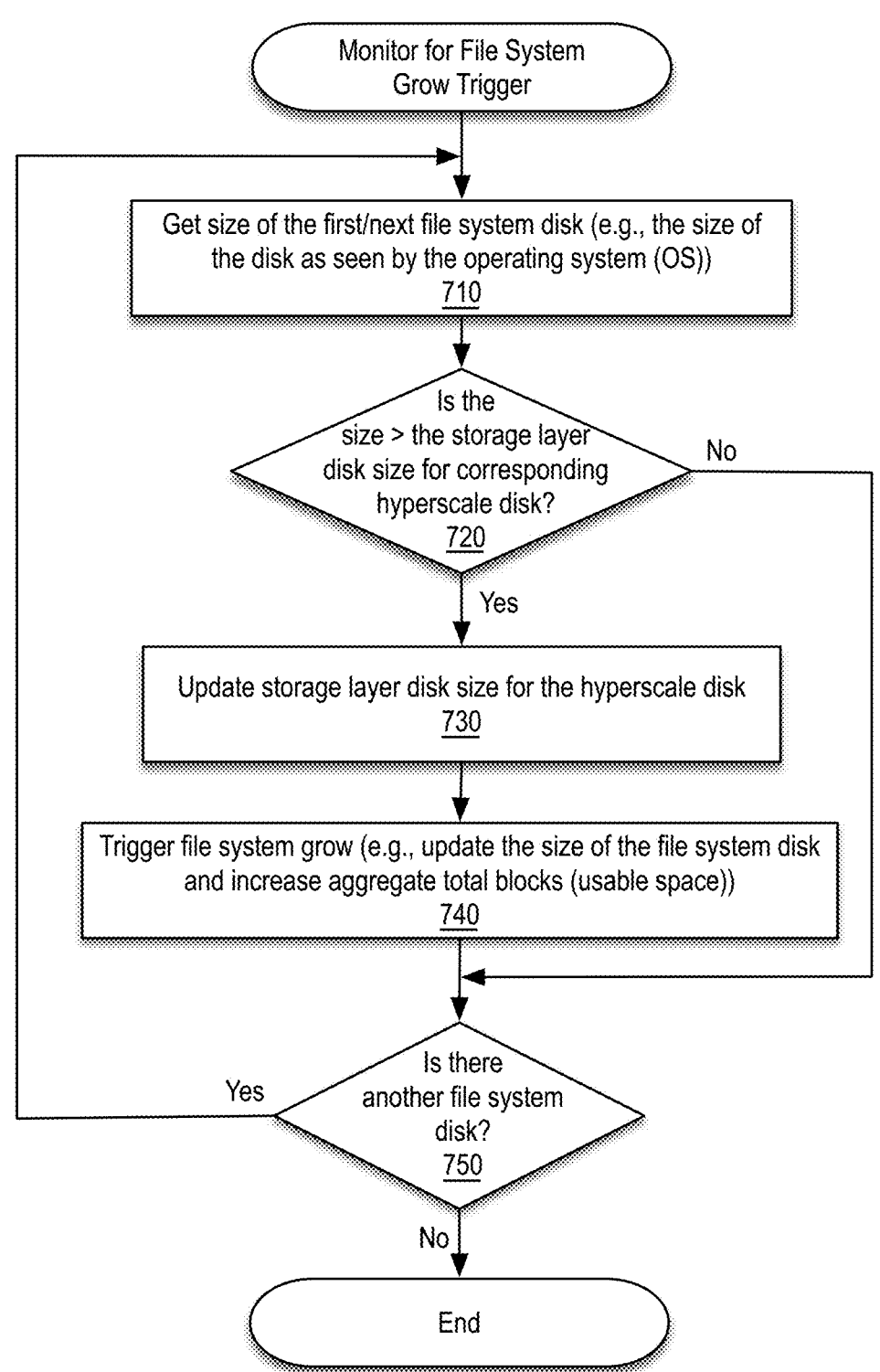
FIG. 7 is a flow diagram illustrating a periodic monitoring process to identify a triggering condition for growing a file system disk in accordance with an embodiment of the present disclosure.

FIG. 7 is a flow diagram illustrating a periodic monitoring process to identify a triggering condition for growing a file system disk in accordance with an embodiment of the present disclosure. Depending upon the particular implementation, the periodic monitoring process may be performed every 60 seconds by a process associated with the storage layer (e.g., storage layer 115) or by an external process. In the context of the present example, the general approach involves checking whether the provisioned storage capacity for any of the underlying hyperscale disks of the virtual storage system has been increased and if so, propagating the change as appropriate.

At block 710, the size of the first/next file system disk is obtained. For example, an appropriate API method of the operating system at issue may be called to obtain the size of the disk as seen by the operating system, which changes responsive to the storage capacity currently provisioned for the corresponding hyperscale disk by the hyperscaler.

At decision block 720, it is determined whether the size obtained at block 710 is greater than the disk size currently persisted within the storage layer, for example, within a disk data structure maintained within the storage layer. If so, then processing continues with block 730; otherwise, processing branches to decision block 750.

At block 730, the storage layer disk size is updated based on the new physical size of the corresponding hyperscale disk.

At block 740, a file system grow is triggered. For example, the size of the file system disk corresponding the hyperscale disk at issue may be updated to reflect the new physical size of the hyperscale disk and information regarding the total number of blocks associated with the aggregate may also be updated.

At decision block 750, it is determined whether there is another file system disk to check. If so, processing loops back to block 710; otherwise, the processing for this monitoring interval is complete.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 8:
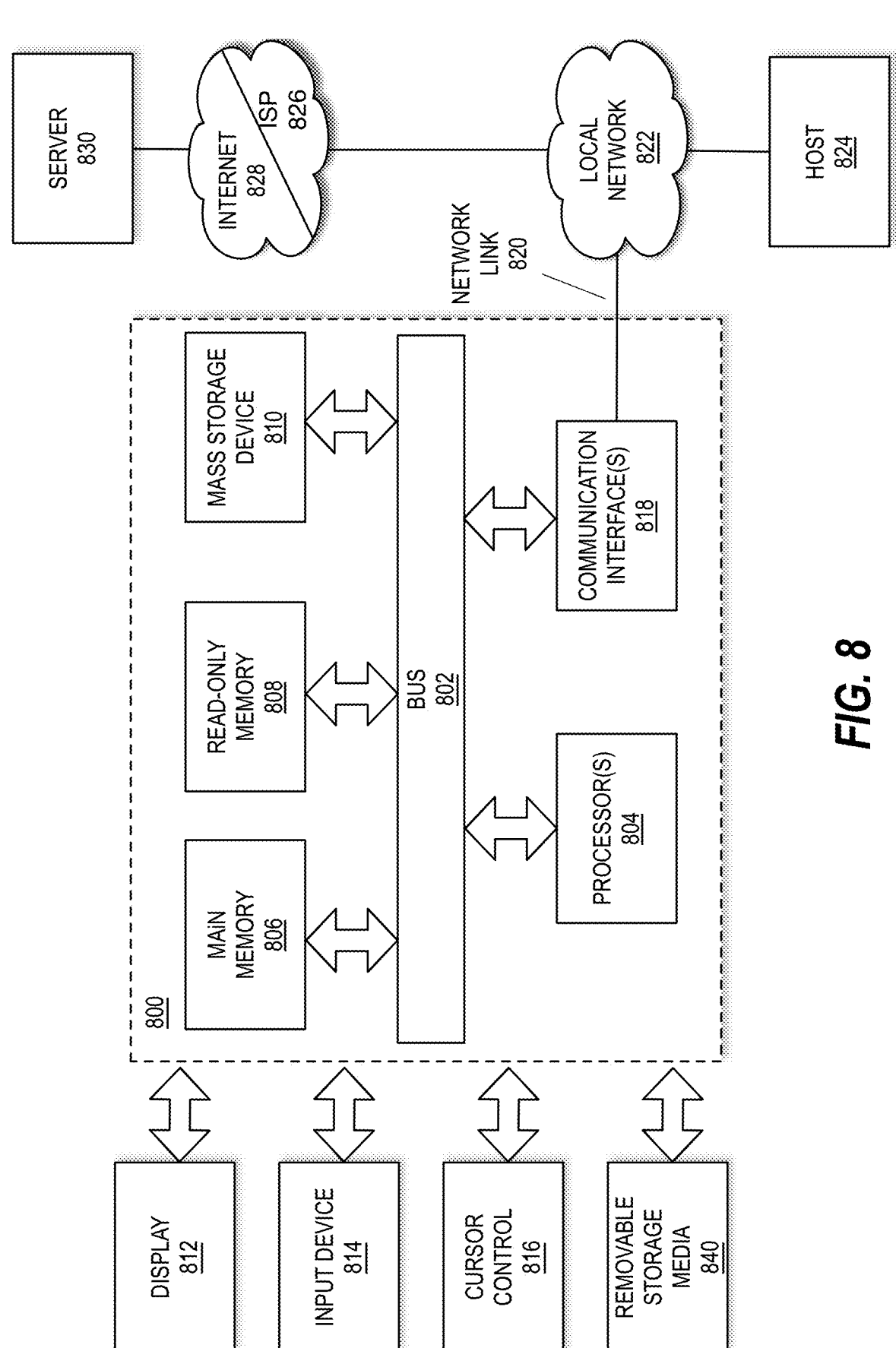
FIG. 8 illustrates an example computer system in which or with which embodiments of the present disclosure may be utilized.

FIG. 8 is a block diagram that illustrates a computer system 800 in which or with which an embodiment of the present disclosure may be implemented. Computer system 800 may be representative of all or a portion of the computing resources associated with a virtual storage system (e.g., virtual storage system 110). Notably, components of computer system 800 described herein are meant only to exemplify various possibilities. In no way should example computer system 800 limit the scope of the present disclosure. In the context of the present example, computer system 800 includes a bus 802 or other communication mechanism for communicating information, and a processing resource (e.g., a hardware processor 804) coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, e.g., a magnetic disk, optical disk or flash disk (made of flash memory chips), is provided and coupled to bus 802 for storing information and instructions.

Computer system 800 may be coupled via bus 802 to a display 812, e.g., a cathode ray tube (CRT), Liquid Crystal Display (LCD), Organic Light-Emitting Diode Display (OLED), Digital Light Processing Display (DLP) or the like, for displaying information to a computer user. An input device 814, including alphanumeric and other keys, is coupled to bus 802 for communicating information and command selections to processor 804. Another type of user input device is cursor control 816, such as a mouse, a trackball, a trackpad, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Removable storage media 840 can be any kind of external storage media, including, but not limited to, hard-drives, floppy drives, IOMEGA® Zip Drives, Compact Disc— Read Only Memory (CD-ROM), Compact Disc—Re-Writable (CD-RW), Digital Video Disk—Read Only Memory (DVD-ROM), USB flash drives and the like.

Computer system 800 may implement the techniques described herein using customized hard-wired logic, one or more ASICs or FPGAs, firmware or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 810. Volatile media includes dynamic memory, such as main memory 806. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, or stored in storage device 810, or other non-volatile storage for later execution.

What is claimed is:

1. A method comprising:

for each disk of a plurality of disks available for use by a storage system, provisioning a portion of a logical size of the disk to a file system of the storage system, wherein the provisioned portion represents a storage capacity of the disk currently available for use by the file system and wherein the storage capacity may grow over time;

maintaining, by the file system, a sparse space for a plurality of file system disks of the storage system, wherein the sparse space comprises a contiguous sequence of block numbers in which respective portions of the sparse space are associated with corresponding file system disks of the plurality of file system disks, wherein each of the plurality of file system disks corresponds to one of the plurality of disks, wherein said maintaining includes accommodating subsequent dynamic growth of the plurality of file system disks, by pre-allocating block numbers for each of the plurality of file system disks within the respective portions of the sparse space corresponding to a number of blocks represented by the logical size of the corresponding disk, and wherein each of the plurality of file system disks is backed by the provisioned portion of the corresponding disk;

for each of the plurality of file system disks, maintaining file system metadata regarding a range of the pre-allocated block numbers that are available for use;

detecting, by the storage system, a triggering condition;

after the triggering condition, causing the provisioned portion of a disk of the plurality of disks to be increased; and detecting, by the storage system, a change in the storage capacity of the disk;

after detecting the change in the storage capacity of the disk, updating within the file system metadata a size of a file system disk of the plurality of file system disks to which the disk corresponds.

2. The method of claim 1, wherein the triggering condition comprises a request for additional storage capacity by an end user of the storage system.

3. The method of claim 1, wherein the triggering condition comprises utilization of available storage capacity of the plurality of disks by the storage system exceeding a threshold.

4. The method of claim 1, wherein the file system metadata regarding the range of the pre-allocated block numbers that are available for use includes a starting block number and a size of respective file system disks of the plurality of file system disks.

5. The method of claim 1, further comprising after the triggering condition, causing the provisioned portion of each disk of the plurality of disks to be increased by a predetermined or configurable number of blocks.

6. The method of claim 1, wherein the storage system comprises a virtual storage system and the plurality of disks comprise hyperscale disks provided by a hyperscaler within which the virtual storage system operates.

7. The method of claim 1, wherein the storage system comprises a physical storage system and the plurality of disks comprise Logical Unit Numbers (LUNs).

8. A non-transitory machine readable medium storing instructions, which when executed by one or more processing resources of a storage system, cause the storage system to:

for each disk of a plurality of disks available for use by the storage system, provision a portion of a logical size of the disk to a file system of the storage system, wherein the provisioned portion represents a storage capacity of the disk currently available for use by the file system and wherein the storage capacity may grow over time;

maintain a sparse space for a plurality of file system disks of the storage system, wherein the sparse space comprises a contiguous sequence of block numbers in which respective portions of the sparse space are associated with corresponding file system disks of the plurality of file system disks, wherein each of the plurality of file system disks corresponds to one of the plurality of disks, wherein maintaining the sparse space includes accommodating subsequent dynamic growth of the plurality of file system disks, by pre-allocating block numbers for each of the plurality of file system disks within the respective portions of the sparse space corresponding to a number of blocks represented by the logical size of the corresponding disk, and wherein each of the plurality of file system disks is backed by the provisioned portion of the corresponding disk;

for each of the plurality of file system disks, maintain file system metadata regarding a range of the pre-allocated block numbers that are available for use;

after detecting a triggering condition, cause the provisioned portion of a disk of the plurality of disks to be increased; and after detecting a change in the storage capacity of the disk, updating within the file system metadata a size of a file system disk of the plurality of file system disks to which the disk corresponds.

9. The non-transitory machine readable medium of claim 8, wherein the triggering condition comprises a request for additional storage capacity by an end user of the storage system.

10. The non-transitory machine readable medium of claim 8, wherein the triggering condition comprises utilization of available storage capacity of the plurality of disks by the storage system exceeding a threshold.

11. The non-transitory machine readable medium of claim 8, wherein the file system metadata regarding the range of the pre-allocated block numbers that are available for use includes a starting block number and a size of respective file system disks of the plurality of file system disks.

12. The non-transitory machine readable medium of claim 8, wherein the instructions further cause the storage system to, after the triggering condition, cause the provisioned portion of each disk of the plurality of disks to be increased by a predetermined or configurable number of blocks.

13. The non-transitory machine readable medium of claim 8, wherein the storage system comprises a virtual storage system and the plurality of disks comprise hyperscale disks provided by a hyperscaler within which the virtual storage system operates.

14. The non-transitory machine readable medium of claim 8, wherein the storage system comprises a physical storage system and the plurality of disks comprise Logical Unit Numbers (LUNs).

15. A storage system comprising:

one or more processing resources; and a non-transitory computer-readable medium, coupled to the one or more processing resources, having stored therein instructions that when executed by the one or more processing resources cause the storage system to:

for each disk of a plurality of disks available for use by the storage system, provision a portion of a logical size of the disk to a file system of the storage system, wherein the provisioned portion represents a storage capacity of the disk currently available for use by the file system and wherein the storage capacity may grow over time;

maintain a sparse space for a plurality of file system disks of the storage system, wherein the sparse space comprises a contiguous sequence of block numbers in which respective portions of the sparse space are associated with corresponding file system disks of the plurality of file system disks, wherein each of the plurality of file system disks corresponds to one of the plurality of disks, wherein maintaining the sparse space includes accommodating subsequent dynamic growth of the plurality of file system disks, by pre-allocating block numbers for each of the plurality of file system disks within the respective portions of the sparse space corresponding to a number of blocks represented by the logical size of the corresponding disk, and wherein each of the plurality of file system disks is backed by the provisioned portion of the corresponding disk;

for each of the plurality of file system disks, maintain file system metadata regarding a range of the pre-allocated block numbers that are available for use;

after detecting a triggering condition, cause the provisioned portion of a disk of the plurality of disks to be increased; and after detecting a change in the storage capacity of the disk, updating within the file system metadata a size of a file system disk of the plurality of file system disks to which the disk corresponds.

16. The storage system of claim 15, wherein the triggering condition comprises a request for additional storage capacity by an end user of the storage system.

17. The storage system of claim 15, wherein the triggering condition comprises utilization of available storage capacity of the plurality of disks by the storage system exceeding a threshold.

18. The storage system of claim 15, wherein the instructions further cause the storage system to, after the triggering condition, cause the provisioned portion of each disk of the plurality of disks to be increased by a predetermined or configurable number of blocks.

19. The storage system of claim 15, wherein the plurality of disks comprise hyperscale disks provided by a hyperscaler within which the storage system operates.

20. The storage system of claim 15, wherein the plurality of disks comprise Logical Unit Numbers (LUNs).

* * * * *